Feb. 6, 1968   J. G. FELTRIN   3,367,081
SPACE DECKS

Filed June 5, 1964   2 Sheets-Sheet 1

INVENTOR
John G. FELTRIN

Featherstonhaugh & Co.
ATTORNEYS

United States Patent Office 3,367,081
Patented Feb. 6, 1968

3,367,081
SPACE DECKS
John G. Feltrin, Montreal, Quebec, Canada, assignor to Dominion Bridge Company Limited, Montreal, Quebec, Canada
Filed June 5, 1964, Ser. No. 372,943
Claims priority, application Canada, Apr. 29, 1964, 901,620
17 Claims. (Cl. 52—648)

This invention relates to an improved method for the fabrication of 3-dimensional type space decks as used in the construction of roof and floor members in buildings and like structures.

Space decks are essentially constant depth horizontal space frames, composed of structural members, which carry their loads two-directionally in a manner similar to flat plates. Thus, concentrated loads are distributed over large areas of the structure, achieving a substantially uniform stress distribution.

The usual application of space decks is to carry roof or floor loads, where the space decks are supported at regular intervals by columns, or continuously supported around a boundary by a bearing wall, beams, or other line support.

3-dimensional space decks are usually constructed by assembling a large number of small mass produced 3-dimensional units into a complete space frame structure. The small 3-dimentional units are usually composed of steel structural members formed into inverted pyramid shape units and assembled together in horizontal arrangement such that the bases of the pyramid shape units form the upper surface of the space deck and the apexes of the pyramids, when interconnected with horizontal tie members, form the lower surface of the space deck.

The space deck is supported, as mentioned above, on convenient apex points of the structure, thus obtaining maximum structural strength.

This conventional arrangement for the construction of 3-dimensional type space decks, whilst providing a satisfactory structure, is also very expensive and time consuming to assemble. This is due to the amount of labour required to individually assemble, by welding or bolting, each 3-dimensional unit into a complete space deck structure.

The present invention overcomes these disadvantages and provides further advantages by providing lower steel tie members arranged in parallel spaced relation to form the lower surface of the space deck. Mass produced open-web steel joists, or trusses, are arranged in parallel spaced relation to extend transversely across the lower tie members with the plane of each open-web arranged to lie at an angle to the planes of the adjacent open webs, such that an end-wise zig-zag arrangement of joists is formed. The space deck is completed by arranging upper steel tie members in parallel spaced relation to extend transversely across the upper chords of the joists and the assembly welded together to form a rigid structure.

The preferred method of assembling the space deck is firstly to arrange the lower tie members in parallel spaced relation. Two open-web joists are then placed transversely across the lower tie members with the lower chords thereof spaced apart and the upper chords thereof in longitudinal abutting relation. The abutting upper chords are then tack welded together and the lower chords tack welded to the lower tie members to form a stable structure. Further joists are then assembled in the same manner and tack welded together to form a zig-zag arrangement of the webs. The upper tie members are then arranged in parallel spaced relation to extend transversely across the upper chords of the joists and the complete assembly rigidly welded together, at all intersecting points, to form the rigid space deck.

This method of assembly embodies the preferred procedure in which the structural members are tack welded together at each stage of assembly to provide a stable structure, whilst the complete structure is rigidly welded together, when assembled, to form a rigid space deck structure. It will be understood, however, that other welding procedures can readily be adapted within the scope of this invention, such as rigid welds being made at each stage of assembly instead of the tack welds.

The open webs of the joists are composed of continuous web bars of zig-zag configuration and thus, when arranged as described above, form a structure having the structural rigidity of the conventional assembly of pyramid shape units and also provide a much simplified assembly procedure.

It is, therefore, the main object of the present invention to provide an improved method for the fabrication of a 3-dimensional space deck by constructing the space deck from mass produced open-web joists and tie members, which are arranged to form a lattice framework structure and rigidly welded together.

Another object of the present invention is to provide an improved method for the fabrication of a 3-dimensional space deck wherein assembly time, and thereby overall cost, is reduced by eliminating the need to individually assemble a large number of small structural units into a complete space deck structure.

A further object of the present invention is to provide an improved space deck structure embodying the structural rigidity of the conventional space decks whilst providing a simplified assembly procedure.

These and other objects and advantages of the present invention will be further apparent by referring to the following detailed specification and drawings in which.

Figure 1:
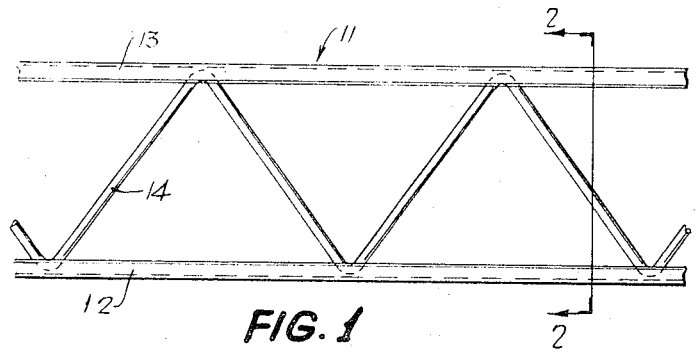
FIG. 1 is a side elevation of one joist.

With reference now to FIGS. 1 to 4, FIG. 1 shows a side elevation of a portion of one open-web joist 11 which comprises lower chord 12 and upper chord 13 with undulating or zig-zag web bar 14 positioned therebetween.

The joists 11 are mass produced prior to assembly into the space deck structure, the lower portions of the web bar undulations being welded to lower chord 12 and the upper portions of the web bar undulations being welded to upper chord 13.

Figure 2:
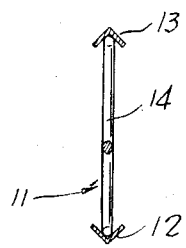
FIG. 2 is a section on 2—2 in FIG. 1, and shows, in detail, the upper and lower chords.

FIG. 2 is a section on 2—2 in FIG. 1 and shows the angular sections of lower and upper chords 12 and 13, respectively.

Figure 3:
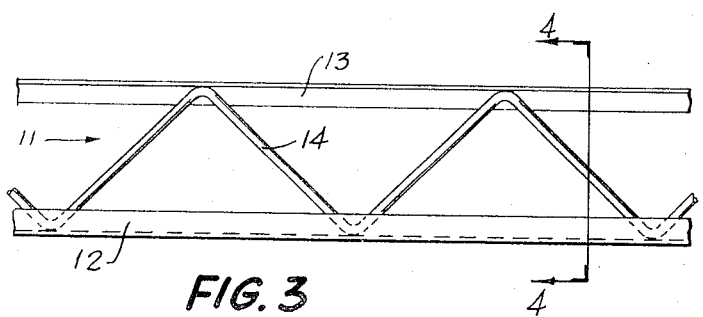
FIG. 3 is a side elevation of two joists arranged with the plane of one joist in angular relation to the plane of the other joist and with the upper chords in longitudinal abutting relation.
Figure 4:
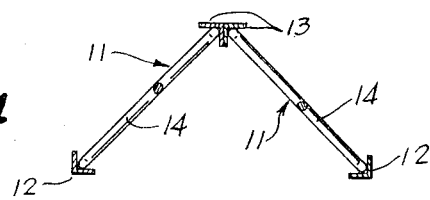
FIG. 4 is a section on 4—4 in FIG. 3 and shows the angular relationship between the planes of each joist.

FIGS. 3 and 4 show portions of two joists 11 arranged with the lower chords 12 spaced apart and with the upper chords 13 in longitudinal abutting relation, such that the planes of the webs of the joints 11 are in angular relation.

FIG. 4 shows how the angular sections of lower and upper chords 12 and 13, respectively, facilitate this side by side arrangement and it will be obvious that as further joists 11 are arranged in a similar manner a zig-zag arrangement will be formed.

The lower and upper chords 12 and 13, respectively, are shown as comprising 90° angle sections and a 90° angular relation between the planes of web bars 14, but it will be understood that many alternative angular relationships can be formed by providing the proper slope of connections between the 90° angle chord sections and the web bars 14.

Figure 5:
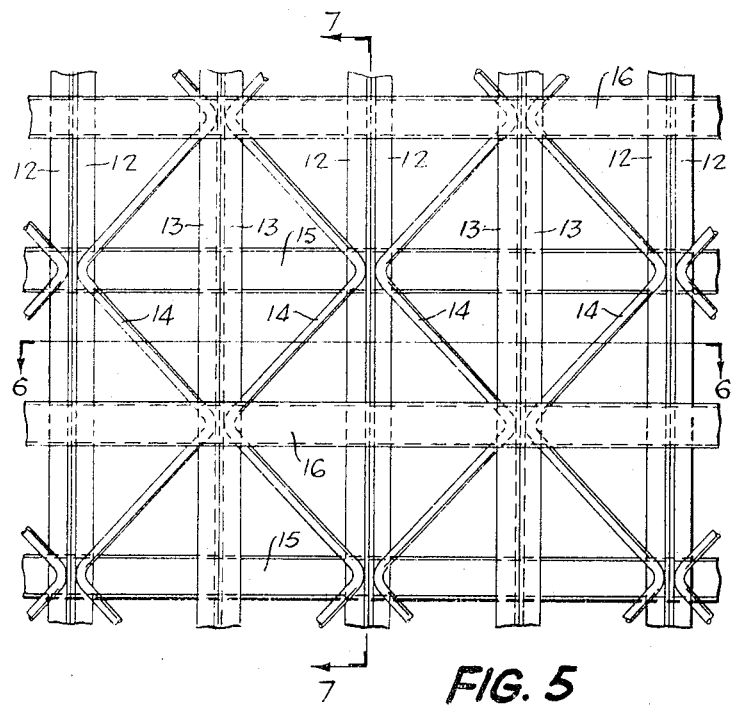
FIG. 5 is a plan elevation of a portion of a space deck embodying the features of the present invention.
Figure 6:
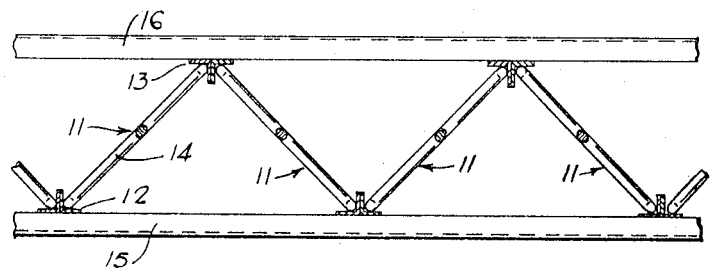
FIG. 6 is a section on 6—6 in FIG. 5.
Figure 7:
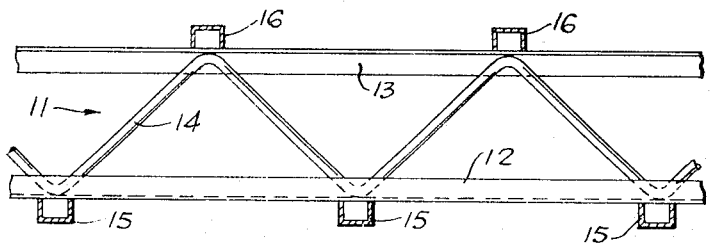
FIG. 7 is a section on 7—7 in FIG. 5.

With reference now to FIGS. 5, 6 and 7, in which FIG. 5 is a plan elevation of a portion of a complete space deck structure, FIG. 6 is a section on 6—6 in FIG. 5 and FIG. 7 is a section on 7—7 in FIG. 5, the complete space deck structure comprises a plurality of lower tie members 15 arranged in parallel spaced relation, as shown in FIGS. 5 and 7, with a plurality of joists 11 arranged transversely across lower tie members 15 in the manner described in FIGS. 3 and 4 and shown in FIG. 6. The space deck is completed by arranging a plurality of upper tie members 16 in parallel spaced relation transversely across the abutting upper chords 13 of joists 11, as shown in FIGS. 5 and 7.

It will again be understood that lower and upper tie members 15 and 16, respectively, are shown as channel section members to describe one embodiment of this invention and that any suitable structural members can be used as lower and upper tie members, depending upon the structural strength requirements of the completed space deck.

Space decks constructed in accordance with the present invention are preferably assembled on the ground, or floor and then lifted to the final elevation by conventional jacking procedures.

Thus the complete assembly procedure for the preferred execution of the present invention would be substantially as follows:

(1) Space deck support columns or other support structures are erected.
(2) Timber supports are then placed on the ground in order to provide a level working area.
(3) The lower tie members 15 are then laid in parallel spaced relation on the timber supports.
(4) Two open-web joists 11 are then arranged transversely across the lower tie members 15 with the lower chords 12 spaced apart and the upper chords 13 in longitudinal abutting relation.
(5) The abutting upper chords 13 are then tack welded together and the lower chords 12 tack welded to lower tie members 15 to form a stable structure.
(6) Further joists 11 are then arranged transversely across lower tie members 15, in a manner similar to item 4, with lower chords 12 and upper chords 13 in longitudinal abutting relation to form a zig-zag arrangement of the planes of the webs. These further joists 11 are also tack welded together and to the lower tie members 15 to stabilize the sub-assembly structure.
(7) Upper tie members 16 are then arranged in parallel spaced relation to extend transversely across the abutting upper chords 13 of joists 11, with each upper tie member 16 being tack welded to upper chords 13.
(8) The completed assembly is then rigidly welded together, at all contact and intersection points, to form a rigid space deck structure.
(9) The tops of the support colums, or other support structures, are then rigged with jacking frames and the completed space deck is lifted into its final position.
(10) The space deck is then rigidly connected to the support columns.

In an alternative method of assembly the structure is rigidly welded together at each stage of sub-assembly, instead of being temporarily tack welded together and then rigidly welded at the final assembly.

Under certain conditions it may be desirable to assemble the space deck on the supports at the final raised elevation and this will require a further alternative assembly procedure.

The open-web joist 11 will be assembled singly, or in pre-assembled pairs, on the elevated supports to form the required zig-zag arrangement of webs. Then the upper and lower tie members 16 and 15, respectively, will be assembled transversely across the upper and lower chords of joists 11 to form the space deck structure. Similar welding procedures will be adapted as for the preferred execution.

It will be understood that the space deck structures may be rigidly fastened together by bolting, or other suitable fastening methods, instead of welding.

It will be further understood that the structure members forming space decks, according to this invention, may be of steel, aluminum or other suitable structure materials.

Although throughout this specification emphasis has been laid on the use of open-web joists as the main structural members, it will be understood that this invention could equally well be adapted to the use of deep trusses, as the main structure members.

What I claim is:

1. A method for the fabrication of a two-way, three-dimensional space deck, the upper and lower boundaries of which define generally parallel upper and lower generally horizontal boundary planes and wherein the structural elements of the space deck which resist forces applied to the deck include joists disposed in non-vertical planes and positioned between the said boundary planes, comprising the steps of: arranging a plurality of joists of indeterminate length in side-by-side abutting relationship, each joist comprising upper and lower substantially parallel spaced chords and a web bar extending in a longitudinal direction, the web bar located between and interconnecting the said upper and lower chords, the plane of each joist being inclined at an angle to the plane of the next adjacent joist whereby the joists are arranged in a substantially zig-zag manner, when viewed in a plane taken transverse to the said longitudinal direction, and attaching the upper chord of each joist to an abutting upper chord of an adjacent joist, and attaching the lower chord of each joist to an abutting lower chord of an adjacent joist, and arranging a plurality of substantially parallel upper and lower tie members above and below the upper and lower chords, respectively, so that the tie members extend in a direction substantially perpendicular to the said longitudinal direction and so that the tie members are located in the said boundary planes, to form a lattice framework, and connecting said upper and lower ties to the upper and lower chords, respectively.

2. A method as set forth in claim 1 in which said lower and upper tie members and said joists are fabricated in steel and including the step of welding the tie members to the joists to form said rigid space deck structure.

3. A method as set forth in claim 2 wherein the step of attaching together abutting chords is performed by tack welding, and said step of attaching the chords to said tie members is performed by permanent welding.

4. The method of claim 1 wherein said web bars are connected only to said chords and said tie members are connected only to said chords.

5. A method as set forth in claim 1 wherein the web bar of each joist is a continuously undulating open-web bar having upper and lower portions which alternately engage the upper chord and lower chord of the joist, and the step of arranging the joists in side-by-side relationship includes transversely aligning the points where the upper portion of the web bars engage the upper chords and transversely aligning the points where the lower portions of the web bars engage the lower chords.

6. The method of claim 5 in which said lower portions of said web bar undulations are arranged to overlie said lower tie members and said upper tie members are arranged to overlie said upper portions of said web bar undulations.

7. A method as set forth in claim 1 wherein the plurality of parallel lower tie members are first arranged in spaced relationship to each other, and the said joists are then arranged on and transverse to the said lower tie members, after which the said plurality of parallel upper tie members are arranged above the said joists in spaced relationship to each other.

8. A method as set forth in claim 7 in which said lower and upper tie members and said joists are fabricated in steel and including the step of welding the tie members to the joists to form said rigid space deck structure.

9. A method as set forth in claim 8 wherein the step of attaching together abutting chords is performed by tack welding, and said step of attaching the chords to said tie members is performed by permanent welding.

10. The method of claim 7 wherein said web bars are connected only to said chords and said tie members are connected only to said chords.

11. A method as set forth in claim 7 wherein the web bar of each joist is a continuously undulating open-web bar having upper and lower portions which alternately engage the upper chord and lower chord of the joist, and the step of arranging the joists in side-by-side relationship includes transversely aligning the points where the upper portion of the web bars engage the upper chords and transversely aligning the points where the lower portions of the web bars engage the lower chords.

12. The method of claim 11 in which said lower portions of said web bar undulations are arranged to overlie said lower tie members and said upper tie members are arranged to overlie said upper portions of said web bar undulations.

13. A two-way, three-dimensional space deck of the type wherein the upper and lower boundaries define generally parallel upper and lower boundary planes and wherein the structural elements of the space deck which resist forces applied to the deck include joists disposed in non-vertical planes positioned between the said boundary planes, comprising: a plurality of joists of indeterminate length positioned side-by-side wherein each joist abuts its adjacent joists, each joist comprising upper and lower substantially parallel spaced chords and a web bar extending in a longitudinal direction, the web bar located between and interconnecting the said upper and lower chords, the plane of each joist being at an angle to the plane of its adjacent joists, whereby the joists are arranged in a substantially zig-zag manner, when viewed in a plane taken transversely to the said longitudinal direction, the said upper chord of each joist being attached to the upper chord of an abutting joist and the lower chord of each joist being attached to the lower chord of an abutting joist, a plurality of substantially parallel upper and lower tie members located above and below the upper and lower chords, respectively, the said tie members extending in a direction substantially perpendicular to the said longitudinal direction and the said tie members located in the said boundary planes.

14. A space deck as claimed in claim 13 in which said lower and upper tie members and said joists are fabricated in steel and are welded together to form said rigid space deck structure.

15. A space deck as claimed in claim 13 wherein each web bar of each joist is a continuously undulating open-web bar having an upper portion and a lower portion which alternately engage the upper chord and the lower chord, and wherein the points of engagement of the said lower portions and the said lower chords of the plurality of joists are transversely aligned, and wherein the said point of engagement between the upper portions and the upper chords of the plurality of joists are also transversely aligned.

16. A space deck as claimed in claim 15 in which the said lower portions of the web bar undulations overlie the said lower tie members and the said upper tie members overlie the said upper portions of the web bar undulations.

17. A space deck as claimed in claim 13 wherein the said web bars are connected only to the chords and the said tie members are connected only to the chords.

References Cited

UNITED STATES PATENTS

| | | | |
|---|---|---|---|
| 845,787 | 5/1907 | Horix | 52—648 |
| 1,911,018 | 5/1933 | Goeltz | 52—648 |
| 2,075,772 | 3/1937 | Vass | 52—655 X |
| 2,075,874 | 4/1937 | Stulen | 52—474 |
| 2,207,952 | 7/1940 | Stulen | 52—648 |
| 2,939,554 | 6/1960 | Bolton et al. | 52—650 |
| 2,979,169 | 4/1961 | Yolles | 52—650 |

FOREIGN PATENTS

| | | |
|---|---|---|
| 1,071,563 | 3/1954 | France. |
| 888,762 | 9/1953 | Germany. |

DAVID J. WILLIAMOWSKY, *Primary Examiner.*

DENNIS L. TAYLOR, REINALDO P. MACHADO, HARRISON R. MOSELEY, *Examiners.*

A. I. BREIER, *Assistant Examiner.*